(12) United States Patent
Sakuma et al.

(10) Patent No.: US 6,370,895 B1
(45) Date of Patent: Apr. 16, 2002

(54) REFRIGERATOR WITH TWO EVAPORATORS

(75) Inventors: Tsutomu Sakuma; Koji Kashima; Masato Tago, all of Ibaraki; Takashi Doi, Uji; Akihiro Noguchi, Ibaraki, all of (JP)

(73) Assignee: Kabushiki Kaisha Toshiba, Kanagawa (JP)

( * ) Notice: Subject to any disclaimer, the term of this patent is extended or adjusted under 35 U.S.C. 154(b) by 22 days.

(21) Appl. No.: 09/666,854

(22) Filed: Sep. 21, 2000

(30) Foreign Application Priority Data

Sep. 21, 1999 (JP) ............................................ 11-266991

(51) Int. Cl.[7] .................................................. F25B 5/00
(52) U.S. Cl. .............................. 62/199; 62/152; 62/200; 62/228.1
(58) Field of Search ............................ 62/199, 151, 152, 62/155, 156, 196.1, 200, 228.1

(56) References Cited

U.S. PATENT DOCUMENTS

| | | |
|---|---|---|
| 2,462,240 A | 2/1949 | Van Vliet et al. |
| 4,084,388 A | 4/1978 | Nelson |
| 4,439,998 A * | 4/1984 | Horvay et al. ................. 62/199 |
| 4,474,026 A * | 10/1984 | Mochizuki et al. ............ 62/157 |
| 4,569,205 A | 2/1986 | Dempou et al. |
| 4,873,837 A * | 10/1989 | Murray .......................... 62/199 |
| 4,959,968 A | 10/1990 | Fukuda |
| 5,465,591 A | 11/1995 | Cur et al. |
| 5,477,915 A * | 12/1995 | Park .............................. 165/30 |
| 6,185,948 B1 * | 2/2001 | Niki et al. ..................... 62/199 |

FOREIGN PATENT DOCUMENTS

| | | |
|---|---|---|
| EP | 0 507 532 A1 | 10/1992 |
| EP | 0 722 264 A2 | 7/1996 |
| FR | 893120 | 5/1944 |
| GB | 1 502 554 | 3/1978 |

OTHER PUBLICATIONS

Patent Abstracts of Japan, Sakuma et al., Refrigerator, 11173729, Jul. 2, 1999.
Patent Abstracts of Japan, Sakuma et al., Refrigerator, 2000028257, Jan. 28, 2000.

* cited by examiner

*Primary Examiner*—Denise L. Esquivel
*Assistant Examiner*—Marc Norman
(74) *Attorney, Agent, or Firm*—Pillsbury Winthrop (57) ABSTRACT

A refrigerator includes a first compartment, a second compartment, a compressor compressing and discharging refrigerant, a first evaporator connected to the compressor to cool the first compartment, the first evaporator having an outlet, a second evaporator connected to the compressor in parallel with the first evaporator to cool the second compartment, the second evaporator having an outlet, a check valve connected between the outlets of the first and second evaporators to prevent the refrigerant out of the first evaporator from entering the second evaporator, a flow-path switching element for switching a cooling mode between a first cooling mode in which the refrigerant discharged from the compressor is caused to flow through the first evaporator to thereby cool the first compartment and a second cooling mode in which the refrigerant discharged from the compressor is caused to flow through the second evaporator to thereby cool the second compartment, and a control device provided for controlling the compressor and the switching element so that the first and second cooling modes are switched alternately and so that the compressor is stopped under the first cooling mode with drop of the temperature in the either compartment.

5 Claims, 6 Drawing Sheets

REFRIGERATOR WITH TWO EVAPORATORS

BACKGROUND OF THE INVENTION

1. Field of the invention

This invention relates to a refrigerator including a cold storage evaporator for cooling a cold storage compartment and a freezer evaporator for cooling a freezer compartment and carrying out a cold storage cooling mode in which the cold storage compartment is cooled by the cold storage evaporator and a freezer cooling mode in which the freezer compartment is cooled by the freezer evaporator, alternately.

2. Description of the prior art

In conventional household refrigerators, refrigerant discharged from a compressor is caused to flow through a condenser, a throttle valve (a capillary tube), an evaporator and the compressor, whereby a refrigerating cycle is constituted. A single evaporator is utilized to cool both a cold storage compartment and a freezer compartment both having different temperature ranges. A temperature sensor is provided for detecting a temperature in the freezer compartment, thereby generating a temperature signal. The compressor and an air circulation fan are controlled to be turned on and off on the basis of the temperature signal so that the temperature in the freezer compartment is controlled. Further, a damper is opened and closed so that a temperature in the cold storage compartment is controlled. In the aforesaid construction, however, it is difficult to accurately control the temperatures in the cold storage and freezer compartments respectively, and a cooling efficiency is low.

In view of the aforesaid problems, the prior art has recently proposed a refrigerator including a cold storage evaporator for cooling a cold storage compartment, a freezer evaporator for cooling a freezer compartment and a flow-path switching valve for switching refrigerant from the compressor between a case where the refrigerant is caused to flow through the cold storage evaporator and a case where the refrigerant is caused to flow through the freezer evaporator, alternately, so that the cold storage and freezer compartments are alternately cooled. Further, in the proposed refrigerator, an operating frequency of the compressor is varied so that the temperatures in the compartments are rendered suitable for the respective compartments. Japanese Patent Application Nos. 9-340377 and 10-192028 disclose refrigerators constructed as described above respectively.

In the proposed refrigerator, the cooling performance is variable according to an amount of load accommodated in the refrigerator. Repeated on-off of the compressor results in cycle loss. Accordingly, the compressor is continuously operated and is not stopped at a normal room temperature for the purpose of reducing the cycle loss and limiting increases in input power and noise at the time of starting of the compressor. However, the compartments are excessively cooled even in the case where the compressor is operated at its lower limit operating frequency when the room temperature is at or below 10° C., for example. As a result, the compressor cannot sometimes be operated continuously. In this case, the compressor is stopped. At this time, when the compressor is stopped under the freezer compartment cooling mode in which the flow-path switching valve causes the compressor to communicate with the freezer compartment evaporator, high temperature refrigerant at the high pressure side flows into the freezer compartment evaporator. Consequently, the temperature of the freezer compartment evaporator becomes higher than those of the compartments. This reduces the cooling efficiency of the compressor when re-started.

SUMMARY OF THE INVENTION

Therefore, an object of the present invention is to provide a refrigerator including a first or cold storage evaporator for cooling a first or cold storage compartment and a second or freezer evaporator for cooling a second or freezer compartment and carrying out a first or cold storage cooling mode in which the cold storage compartment is cooled by the cold storage evaporator and a first or freezer cooling mode in which the freezer compartment is cooled by the freezer evaporator, alternately, wherein the high temperature refrigerant can be prevented from entering the freezer compartment evaporator when the compressor is stopped, so as to limit an increase in the temperature of the freezer compartment evaporator.

The present invention provides a refrigerator comprising a first compartment, a second compartment, a compressor compressing and discharging refrigerant, a first evaporator connected to the compressor to cool the first compartment, the first evaporator having an outlet, a second evaporator connected to the compressor in parallel with the first evaporator to cool the second compartment, the second evaporator having an outlet, a check valve connected between the outlets of the first and second evaporators to prevent the refrigerant out of the first evaporator from entering the second evaporator, a flow-path switching element for switching a cooling mode between a first cooling mode in which the refrigerant discharged from the compressor is caused to flow through the first evaporator to thereby cool the first compartment and a second cooling mode in which the refrigerant discharged from the compressor is caused to flow through the second evaporator to thereby cool the second compartment, and a control device provided for controlling the compressor and the switching element so that the first and second cooling modes are switched alternately and so that the compressor is stopped under the first cooling mode with drop of the temperature in the either compartment.

In the first cooling mode, the compressor communicates with the first or cold storage evaporator though shut off from the second or freezer evaporator. When the compressor is stopped in this state, no high temperature refrigerant enters the second evaporator from the high pressure side. Moreover, since the check valve at the outlet side of the second evaporator is actuated, no refrigerant flows backward from the first evaporator to the second evaporator. Consequently, high temperature refrigerant can be prevented from entering the second evaporator upon stop of the compressor, whereupon increase in the temperature of the second evaporator can be limited.

In a first preferred form, the refrigerator further comprises a defrosting heater for defrosting the second evaporator, and the control device controls the compressor so that the operation of the compressor is stopped under the second cooling mode when the second evaporator is defrosted by the defrosting heater. In the second cooling mode, the compressor communicates with the second evaporator. When the compressor is stopped in this state, high temperature refrigerant flows into the second evaporator from the high pressure side. Thus, positive inflow of the high temperature refrigerant enhances increase in the temperature of the second evaporator, thereby reducing a defrosting time for the second evaporator.

In a second preferred form, the control device controls the compressor so that the compressor is re-started under the second cooling mode after the second evaporator has been defrosted. Low temperature refrigerant can be retained in the second evaporator under the second cooling mode. Since cooling is performed by a suitable amount of refrigerant in a subsequent first cooling mode, back flow of excess refrigerant can be prevented, and efficient cooling can be performed with a suitable amount of refrigerant in each cooling mode.

In a third preferred form, the refrigerator further comprises two defrosting heaters for defrosting the first and second evaporators respectively, and the control device controls the defrosting heaters so that either evaporator not in operation is defrosted by the corresponding defrosting heater during execution of either cooling mode. Since each evaporator is defrosted when necessary and the compressor need not be stopped, a useless temperature increase with stop of the compressor can be prevented at the side of the evaporator which need not be defrosted.

In a fourth preferred form, the control device controls the compressor and the flow-path switching element so that the second cooling mode is first carried out when the refrigerator is connected to a power supply. In the fourth preferred form, too, low temperature refrigerant can be retained in the second evaporator under the second cooling mode. Since cooling is performed with a suitable amount of refrigerant in a subsequent first cooling mode, back flow of excess refrigerant can be prevented, and efficient cooling can be performed with a suitable amount of refrigerant in each cooling mode.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
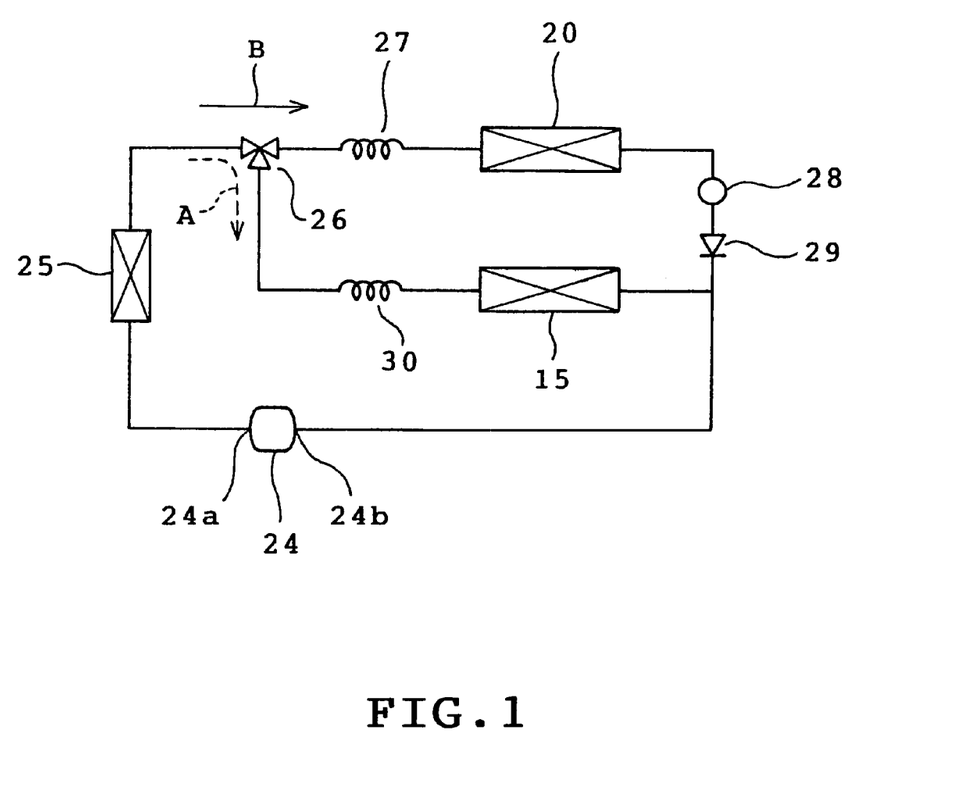
FIG. 1 illustrates a refrigerating cycle employed in the refrigerator of a first embodiment in accordance with the present invention.
Figure 2:
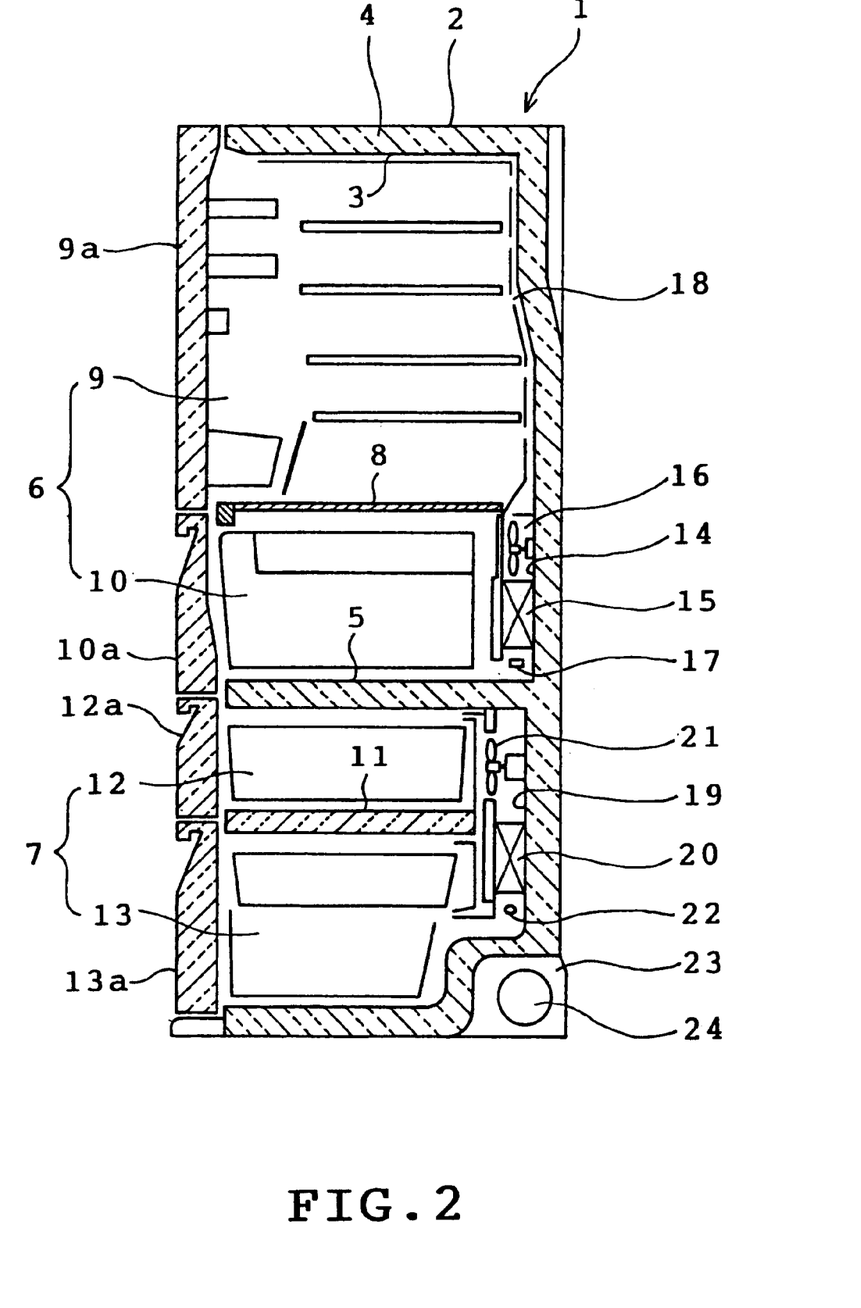
FIG. 2 is a longitudinal side section of the refrigerator.

A first embodiment of the invention will be described with reference to FIGS. 1 to 5E. Referring first to FIG. 2, the overall construction of the refrigerator of the first embodiment is shown. The refrigerator comprises a refrigerator body 1 or a well-known heat-insulated housing formed by assembling an outer casing 2 made of a steel plate and an inner casing 3 made of a synthetic resin and filling a space between the casings 2 and 3 with a heat-insulating foam 4. The body 1 has an interior divided by a heat-insulating partition wall 5 into an upper cold storage space 6 and a lower freezer space 7. The body 1 is constructed so that cold air in the cold storage space 6 is independent from and is not mixed with cold air in the freezer space 7.

The cold storage space 6 is partitioned by a partition plate 8 into a cold storage compartment 9 and a vegetable compartment 10. The freezer space 7 is partitioned by a partition wall 11 into first and second freezer compartments 12 and 13. A door 9a is hingedly mounted on the front of the cold storage compartment 9. Three storage containers (not shown) are accommodated in the vegetable compartment 10 and the freezer compartments 12 and 13 respectively. Three drawable doors 10a, 12a and 13a are connected to the storage containers and disposed on the fronts of vegetable and freezer compartments 10, 12 and 13 respectively.

A cold storage cooling compartment 14 is defined in the rear of the vegetable compartment 10. The cooling compartment 14 encloses a first or cold storage evaporator 15, a cold storage compartment circulation fan 16 and a first defrosting heater 17 therein. Cold air produced by the first evaporator 15 is supplied by the blowing action of the circulation fan 16 through a cold air duct 18 into the cold storage compartment 9 and the vegetable compartment 10. Thereafter, the cold air supplied into the compartments 9 and 10 is returned into the cooling compartment 14. The cold air is thus circulated, cooling the cold storage compartment 9 and the vegetable compartment 10. Further, a freezer cooling compartment 19 is defined in the rear of the space 7. The cooling compartment 19 encloses a second or freezer evaporator 20, a circulation fan 21 and a second defrosting heater 22. Cold air produced by the second evaporator 20 is supplied by the blowing action of the circulation fan 21 into the first and second freezer compartments 12 and 13, thereafter returned into the cooling compartment 19. The cold air is thus circulated, cooling the first and second freezer compartments 12 and 13.

A machine compartment 23 is defined in the lower rear of the body 1. A compressor 24, a condenser 25, etc. constituting the refrigeration cycle as shown in FIG. 1 are provided in the machine compartment 23. The condenser 25 is not shown in FIG. 2. The compressor 24 has a discharge outlet 24a connected via the condenser 25 to an inlet of a three-way type switching valve 26 serving as a flow-path switching element in the invention. The switching valve 26 has one of two outlets connected via a freezer capillary tube 27 to an inlet of second evaporator 20. The second evaporator 20 has an outlet connected via an accumulator 28 to an inlet of a check valve 29. The check valve 29 has an outlet connected to refrigerant entrance 24b of the compressor 24. Further, the switching valve 26 has the other outlet connected via a cold storage capillary tube 30 to an inlet of the first evaporator 15. The first evaporator 15 has an outlet connected to an outlet of the check valve 29. Accordingly, the first and second evaporators 15 and 20 are connected to the compressor 24 in parallel to each other. The second evaporator 20 has an outlet connected via the check valve 29 to the outlet of first evaporator 15. The check valve 29 allows the refrigerant discharged from the outlet side of the second evaporator 20 to flow toward the entrance 24b side of the compressor 24 but prevents the refrigerant discharged out of the first evaporator 15 from flowing toward the second evaporator 20 side.

Consider now a case where the switching valve 26 switches the refrigerant path with the compressor 24 being driven so that the refrigerant discharged from the compressor flows toward the first evaporator 15 side. This state is shown by broken line arrow A in FIG. 1. In this state, the refrigerant compressed by the compressor 24 is fed as a high temperature high pressure gas into the condenser 25. The gas radiates heat in the condenser 25 to be thereby liquefied. The liquefied refrigerant flows through the switching valve 26 in the direction of arrow A, further flowing through the cold storage capillary tube 30 into the first evaporator 15. The refrigerant evaporates in the first evaporator 15 to absorb ambient heat, thereby cooling ambient air. The gasified refrigerant is re-compressed by the compressor 24. At this time, the cold air produced by the first evaporator 15 is supplied by the blowing action of the circulation fan 16 into the cold storage compartment 9 and the vegetable compartment 10, cooling these compartments. In this case, since the cold storage compartment 9 is set at a cooling temperature of +2° C., for example, an operating frequency of the compressor 24 is set so that a cooling temperature by the first evaporator 15 is at about −5° C. Further, the first evaporator 15 has a pressure of about 0.24 MPa, for example. Thus, the switching valve 26 switches the flow path so that the refrigerant discharged from the compressor 24 flows toward the first evaporator 15 side, whereby the cold storage compartment 9 and the vegetable compartment 10 are cooled. This cooling manner is referred to as "first or cold storage cooling mode."

Further, consider a case where the switching valve 26 switches the refrigerant path with the compressor 24 being driven so that the refrigerant discharged from the compressor flows toward the second evaporator 20 side. This state is shown by solid line arrow B in FIG. 1. In this state, the refrigerant liquefied by the condenser 25 flows through the switching valve 26 in the direction of arrow B, further flowing through the freezer capillary tube 27 into the second evaporator 20. The refrigerant evaporates in the second evaporator 20 to absorb ambient heat, thereby cooling ambient air. The gasified refrigerant flows through the accumulator 28 and the check valve 29, re-compressed by the compressor 24. At this time, the cold air produced by the second evaporator 20 is supplied by the blowing action of the circulation fan 21 into the first and second freezer compartments 12 and 13, cooling these compartments. In this case, since each of the freezer compartments 12 and 13 is set at a cooling temperature of −18° C., for example, an operating frequency of the compressor 24 is set so that a cooling temperature by the second evaporator 20 is at about −28° C. Further, the second evaporator 20 has a pressure of about 0.09 MPa, for example. Thus, the switching valve 26 switches the flow path so that the refrigerant discharged from the compressor 24 flows toward the second evaporator 20 side, whereby the freezer compartments 12 and 13 are cooled. This cooling manner is referred to as "second or freezer cooling mode."

Figure 3:
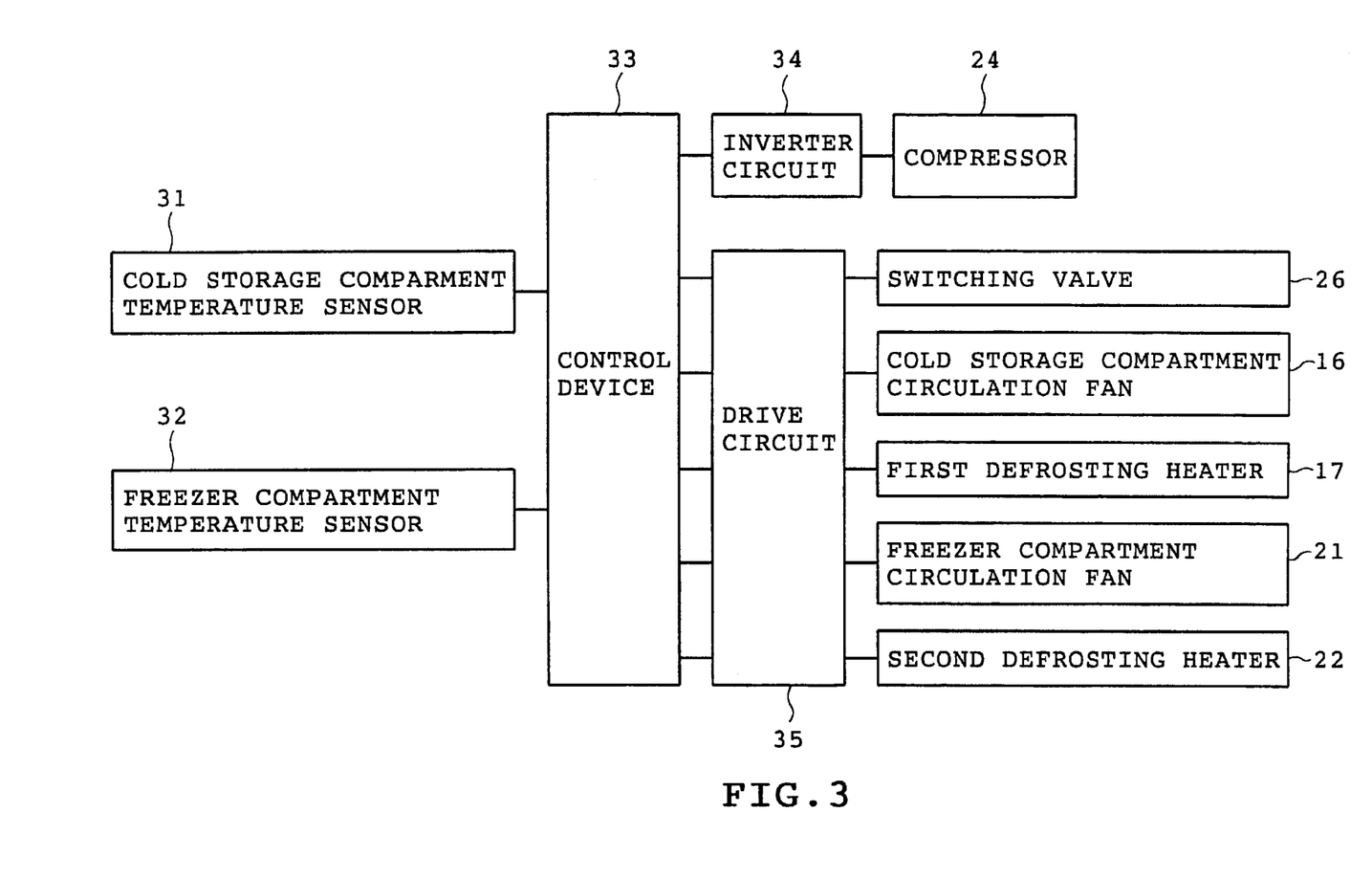
FIG. 3 is a schematic block diagram showing an electrical arrangement of the refrigerator.

FIG. 3 schematically illustrates an electrical arrangement of the refrigerator. A first or cold storage compartment temperature sensor 31 is provided for detecting a temperature in the cold storage compartment 9, thereby delivering a temperature signal. A second or freezer compartment temperature sensor 32 is provided for detecting, for example, a temperature in the second freezer compartment 13, thereby delivering a temperature signal. The first and second temperature sensors 31 and 32 are connected to input ports (not shown) of a control device 33 respectively. The control device 33 mainly comprises a microcomputer (not shown) and has one of a plurality of output ports (not shown) connected via an inverter circuit 34 to the compressor 24. Other output ports of the control device 33 are connected via a drive circuit 35 to the switching valve 26, circulation fan 16, defrosting heater 17, circulation fan 21, defrosting heater 22 and a cooling fan (not shown) for cooling the machine compartment respectively. Based on the temperature signals from the temperature sensors 31 and 32 and a previously stored control program, the control device 33 controls the compressor 24, switching valve 26, circulation fans 16 and 21, defrosting heaters 17 and 22, cooling fan, etc.

The pressure changes in the first and second evaporators 15 and 20 under the first and second cooling modes will be described with reference to FIGS. 4A to 4D. Under the second cooling mode, the second evaporator 20 is cooled so that the cooling temperature of about −28° C. is reached, as described above. Further, the second evaporator 20 has the pressure of about 0.09 MPa as described above. At this time, the pressure of the first evaporator 15 having the outlet connected to the outlet side of the second evaporator 20 is equal to that (about 0.09 MPa) of the second evaporator. In this state, when the cooling mode is switched from the second cooling mode to the first cooling mode, the operating frequency of the compressor 24 is varied so that the temperature of the first evaporator 15 becomes about −5° C. The operating frequency is varied from 50 Hz to 30 Hz in this case. With this, the pressure of the first evaporator 15 is increased to about 0.24 MPa. As a result, there is a pressure difference of about 0.15 MPa between the first and second evaporators 15 and 20, whereupon the check valve 29 connected to the outlet of the second evaporator 20 is actuated. More specifically, the refrigerant whose temperature is at about −28° C. is retained and a saturation pressure is reached in the second evaporator 20, so that the second evaporator is maintained at the low temperature state.

Figure 4A:
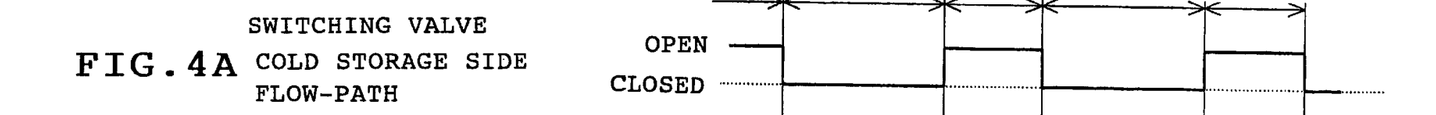
FIGS. 4A to 4D show the state of a switching valve, an operating frequency of a compressor and pressure changes of evaporators in a refrigerating compartment cooling mode and a freezer compartment cooling mode.
Figure 4B:
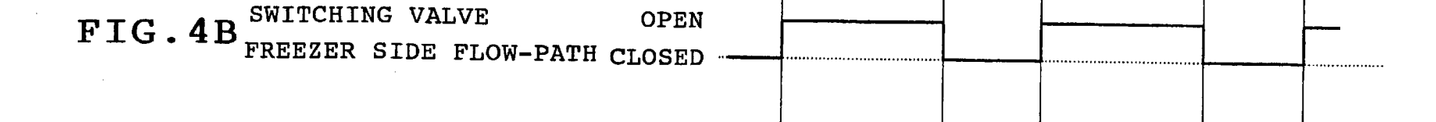
Figure 4C:
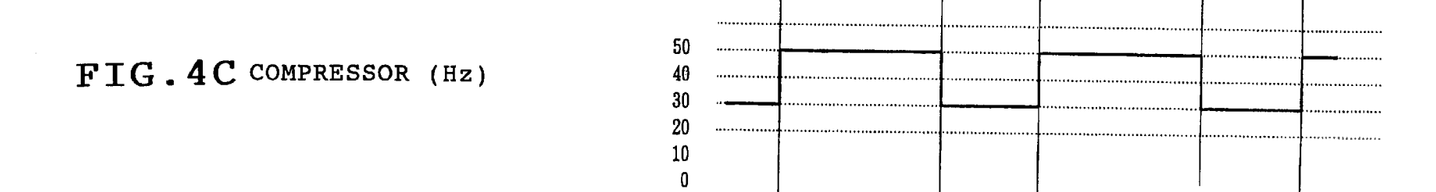
Figure 4D:
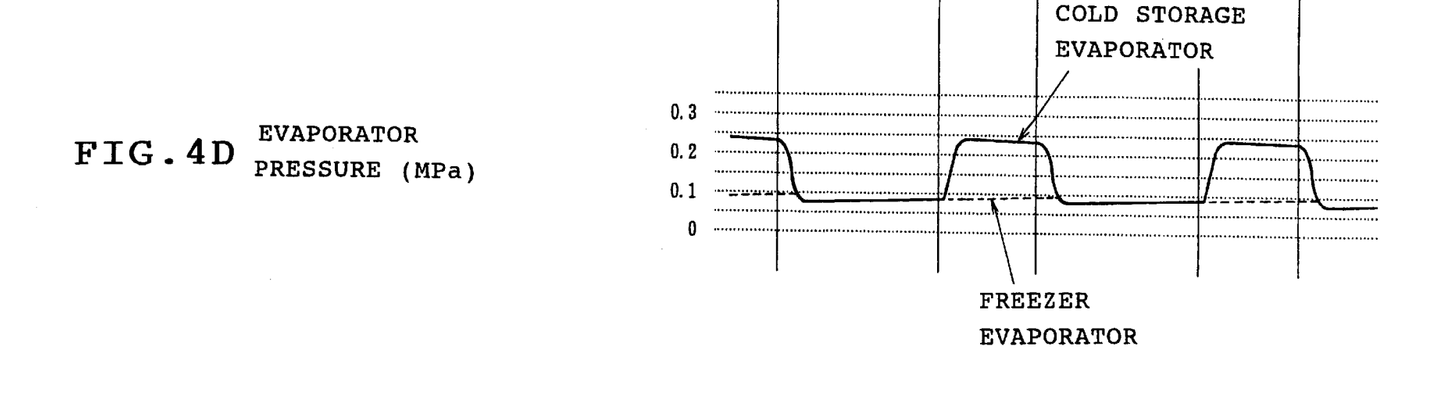
Figure 5A:
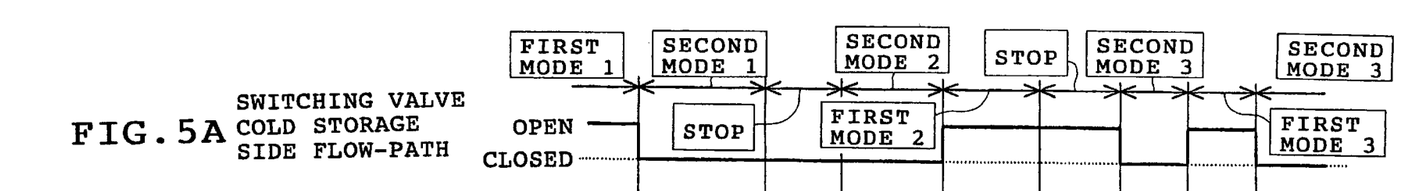
FIGS. 5A to 5E show the state of the switching valve, the operating frequency of the compressor and temperature changes of the respective evaporators in each cooling mode.
Figure 5B:
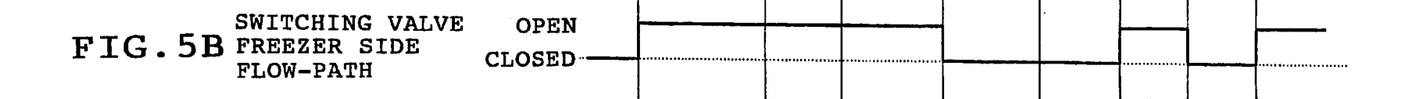
Figure 5C:
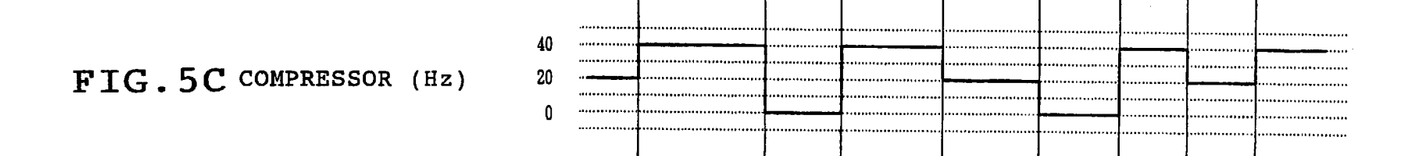
Figure 5D:
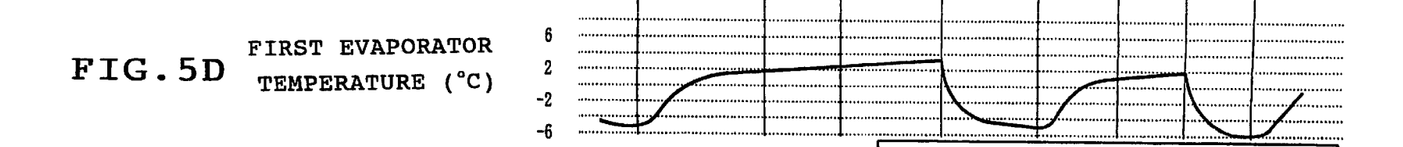
Figure 5E:
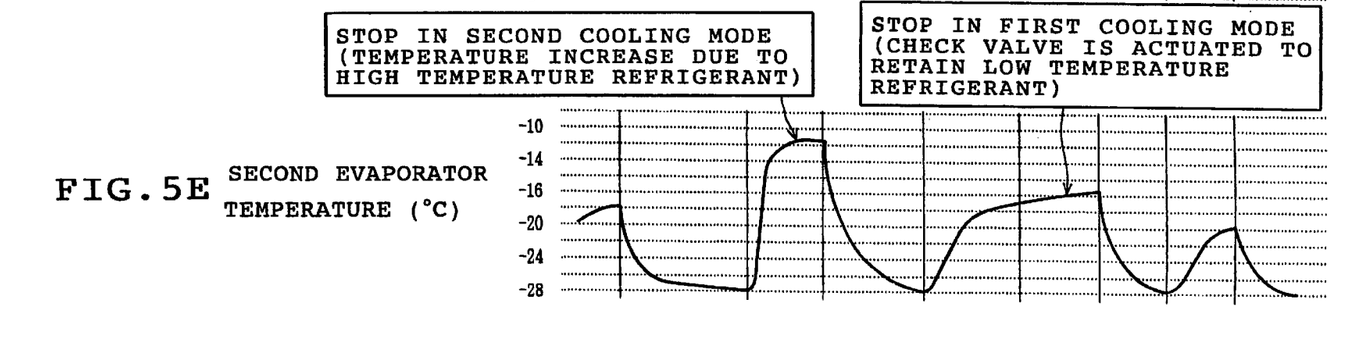

The operation of the refrigerator will now be described. FIGS. 5A to 5E show the state of the switching valve 26, the operating frequency of the compressor 24 and temperature changes of the respective evaporators 15 and 20 in each cooling mode. The operation of the compressor 24 is stopped when the compartments 9, 10, 12 and 13 are cooled such that respective set temperatures ate reached. This is carried out under the first cooling mode. Thus, the compressor 24 is stopped under the first cooling mode when the set temperatures are reached in the respective compartments 9, 10, 12 and 13. See "STOP" after "FIRST MODE 2" in FIGS. 5A–5E. Under the first cooling mode, the discharge outlet 24a of the compressor 24 communicates via the switching valve 26 with the inlet of the first evaporator 15. See arrow A in FIG. 1. However, the discharge outlet 24a is shut off from the inlet of second evaporator 20. When the operation of the compressor 24 is stopped under the conditions, the high temperature refrigerant from the high pressure side is prevented from entering the second evaporator 20. Moreover, since the aforesaid pressure difference as shown in FIG. 4D actuates the check valve 29, the refrigerant is prevented from flowing backward from the first evaporator 15 to the second evaporator 20. The low temperature refrigerant is retained in the second evaporator 20 such that an increase in the temperature in the second evaporator 20 is limited. Further, the second cooling mode is first carried out when the compressor 24 is re-started. See "SECOND MODE 3" in FIGS. 5A–5E. At this time, since the low temperature refrigerant retained in the second evaporator 20 is re-circulated, the cooling efficiency can be improved.

The following is a drawback in a case where the operation of the compressor 24 is stopped under the second cooling mode (see "STOP" after "SECOND MODE 1 in FIGS. 5A–5E) when the set temperatures are reached in the respective compartments 9, 10, 12 and 13. Under the second cooling mode, the discharge outlet 24a of the compressor 24 communicates via the switching valve 26 with the inlet of the second evaporator 20 as shown by arrow B in FIG. 1. When the compressor 24 is stopped in this state, the high temperature refrigerant from the high pressure side enters the second evaporator 20, increasing the temperature of this evaporator. In this case, the cooling efficiency is reduced upon re-start of the compressor 24. On the other hand, the operation of the compressor 24 is stopped under the second cooling mode when the second evaporator 20 is defrosted by the defrosting heater 22. See "STOP" after "SECOND MODE 1 in FIGS. 5A–5E. Since the compressor 24 communicates with the second evaporator 20 under the second cooling mode, the high temperature refrigerant from the high pressure side enters the second evaporator. Thus, the high temperature refrigerant is caused to positively flow into the second evaporator 20 such that an increase of the temperature in the second evaporator 20 is enhanced, whereby a defrosting time can be shortened regarding the second evaporator.

Further, the compressor 24 is re-started under the second cooling mode after the second evaporator 20 has been defrosted. See "SECOND MODE 2" in FIGS. 5A–5E. Under the second cooling mode, the low temperature refrigerant can be retained in the second evaporator 20 and the cooling can be carried out with a suitable amount of refrigerant in the subsequent first cooling mode. Consequently, since back flow of excess refrigerant is prevented, an efficient cooling can be performed with a suitable amount of refrigerant in each cooling mode. On the other hand, when the compressor 24 is re-started under the second cooling mode after the second evaporator 20 has been defrosted, no excess refrigerant is reserved in the second evaporator such that the cooling operation is performed under an overcharged state of the refrigerant. In other words, back flow of excess refrigerant occurs such that an inefficient cooling operation is performed.

The second evaporator 20 which is not in operation is defrosted by the defrosting heater 22, for example, during execution of the first cooling mode. Further, the first evaporator 15 which is not in operation is defrosted by the defrosting heater 17 during execution of the second cooling mode. Each evaporator is thus defrosted independently, and the compressor 24 need not be turned off during defrosting. Consequently, a useless temperature increase with stop of the compressor can be prevented at the side of the evaporator which need not to be defrosted.

The second cooling mode is first carried out when the refrigerator is connected to a power supply. In this case, too, back flow of excess refrigerant can be prevented, and efficient cooling can be performed with a suitable amount of refrigerant in the second and subsequent first cooling modes.

Figure 6:
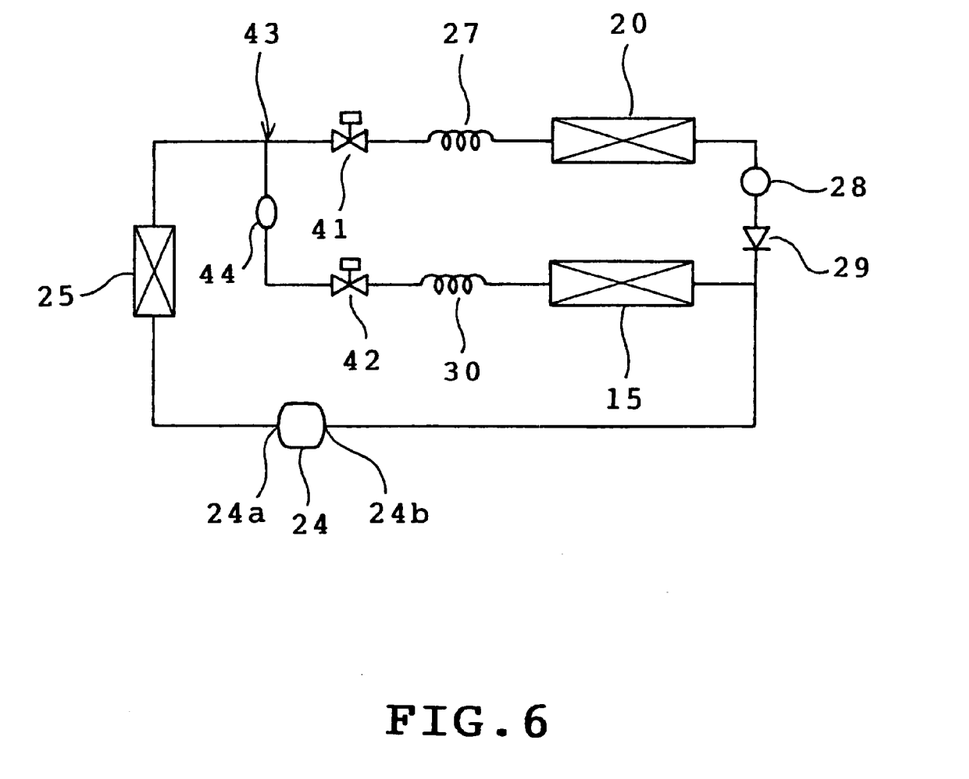
FIG. 6 is view similar to FIG. 1, showing the refrigerator of a second embodiment in accordance with the invention.

FIG. 6 illustrates a second embodiment of the invention. In the second embodiment, two two-way type valves 41 and 42 are provided instead of the three-way type switching valve 26. The valves 41 and 42 constitute the flow-path switching element in the invention. More specifically, the valve 41 is provided between a branch point 43 and the freezer capillary tube 27 whereas a receiver tank 44 and the valve 42 are provided between the branch point 43 and the cold storage capillary tube 30. The valves 41 and 42 are controlled so that one of the valves is closed when the other is open and so that one valve is open when the other is closed. The receiver tank 44 is provided for storing excess refrigerant.

Excess refrigerant is stored in the receiver tank 44 during execution of the second cooling mode, so that the second evaporator 20 is cooled with a suitable amount of refrigerant. When the cooling mode is subsequently switched to the first cooling mode, the low-temperature refrigerant is retained in second evaporator 20 in the same manner as described above, and the refrigerant stored in the receiver tank 44 is circulated through the first evaporator 15. Each of the first and second cooling modes can be carried out with a suitable amount of refrigerant.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A refrigerator comprising:
   a first compartment;
   a second compartment;
   a compressor compressing and discharging refrigerant;
   a first evaporator connected to the compressor to cool the first compartment, the first evaporator having an outlet;
   a second evaporator connected to the compressor in parallel with the first evaporator to cool the second compartment, the second evaporator having an outlet;
   a check valve connected between the outlets of the first and second evaporators to prevent the refrigerant out of the first evaporator from entering the second evaporator;
   a flow-path switching element for switching a cooling mode between a first cooling mode in which the refrigerant discharged from the compressor is caused to flow through the first evaporator to thereby cool the first compartment and a second cooling mode in which the refrigerant discharged from the compressor is caused to flow through the second evaporator to thereby cool the second compartment; and
   a control device provided for controlling the compressor and the switching element so that the first and second cooling modes are switched alternately and so that the compressor is stopped under the first cooling mode with drop of the temperature in the either compartment.

2. The refrigerator according to claim 1, further comprising a defrosting heater for defrosting the second evaporator, and in that the control device controls the compressor so that the operation of the compressor is stopped under the second cooling mode when the second evaporator is defrosted by the defrosting heater.

3. The refrigerator according to claim 1, wherein the control device controls the compressor so that the compressor is re-started under the second cooling mode after the second evaporator has been defrosted.

4. The refrigerator according to claim 1, further comprising two defrosting heaters for defrosting the first and second evaporators, wherein the control device controls the defrosting heaters so that either evaporator not in operation is defrosted by the corresponding defrosting heater during execution of either cooling mode.

5. The refrigerator according to claim 1, wherein the control device controls the compressor and the flow-path switching element so that the second cooling mode is first carried out when the refrigerator is connected to a power supply.

* * * * *